United States Patent [19]
McAdam

[11] 3,816,182
[45] June 11, 1974

[54] TAPE THERMOCOUPLE WITH INSULATION PIERCING JUNCTION MEANS

[75] Inventor: Will McAdam, Bluebell, Pa.

[73] Assignee: Leeds & Northrup Company, North Wales, Pa.

[22] Filed: Aug. 30, 1972

[21] Appl. No.: 285,010

[52] U.S. Cl................. 136/230, 136/225, 136/233, 136/235, 339/182 R
[51] Int. Cl................................................. H01v 1/04
[58] Field of Search........... 136/200, 201, 225, 226, 136/230, 232, 233, 235, 234; 339/182 R, 183

[56] References Cited
UNITED STATES PATENTS

| | | | |
|---|---|---|---|
| 2,490,817 | 12/1949 | Klingel | 136/233 |
| 2,665,322 | 1/1954 | MacDonald | 136/201 X |
| 2,735,882 | 2/1956 | Farley | 136/226 UX |
| 2,813,425 | 11/1957 | Woolley | 136/226 X |
| 2,972,125 | 2/1961 | Temple et al. | 339/183 R |
| 3,360,404 | 12/1967 | Beckman | 136/230 |
| 3,416,973 | 12/1968 | Benzinger | 136/235 |
| 3,464,864 | 9/1969 | Rentz | 136/230 X |
| 3,512,248 | 5/1970 | Nagy et al. | 136/200 X |
| 3,548,490 | 12/1970 | Jordan et al. | 136/201 UX |
| 3,729,343 | 4/1973 | Thomas | 136/225 |

FOREIGN PATENTS OR APPLICATIONS

| | | | |
|---|---|---|---|
| 410,572 | 5/1934 | Great Britain | 136/233 |
| 854,570 | 11/1960 | Great Britain | 136/233 |
| 1,926,583 | 12/1970 | Germany | 136/234 |

OTHER PUBLICATIONS

Trinity, "Insulated Thermocouple and Extension Wire," Bulletin, TT-318 (1962), Trinity Equipment Corporation, Cortland, N.Y.

Primary Examiner—Carl D. Quarforth
Assistant Examiner—E. A. Miller
Attorney, Agent, or Firm—Woodcock, Washburn, Kurtz & Mackiewicz

[57] ABSTRACT

Twin lead thermocouple tape, thermocouples made therefrom, and methods for making the thermocouples including means to insure connection of the thermocouple to a circuit with the proper polarity.

2 Claims, 27 Drawing Figures

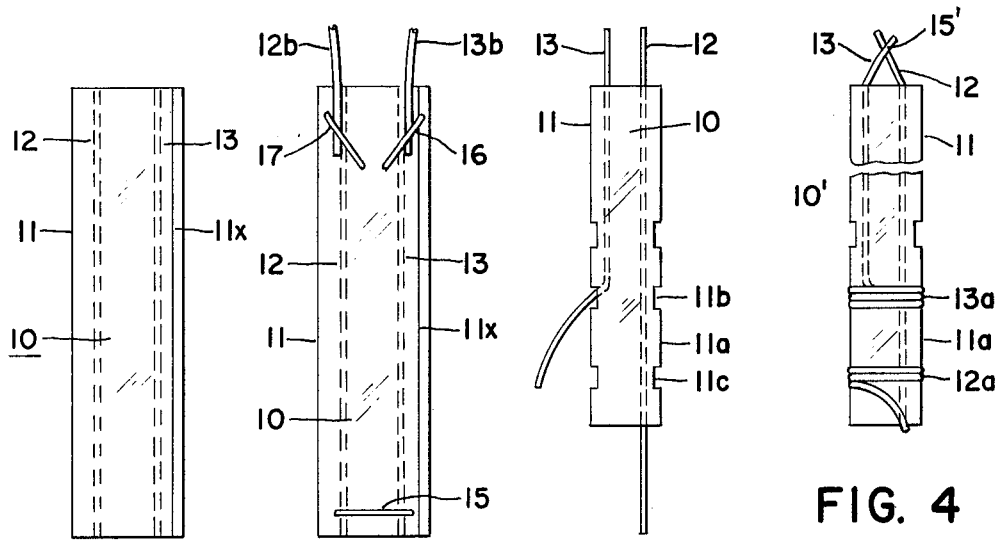
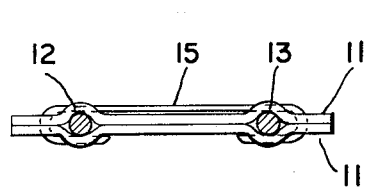
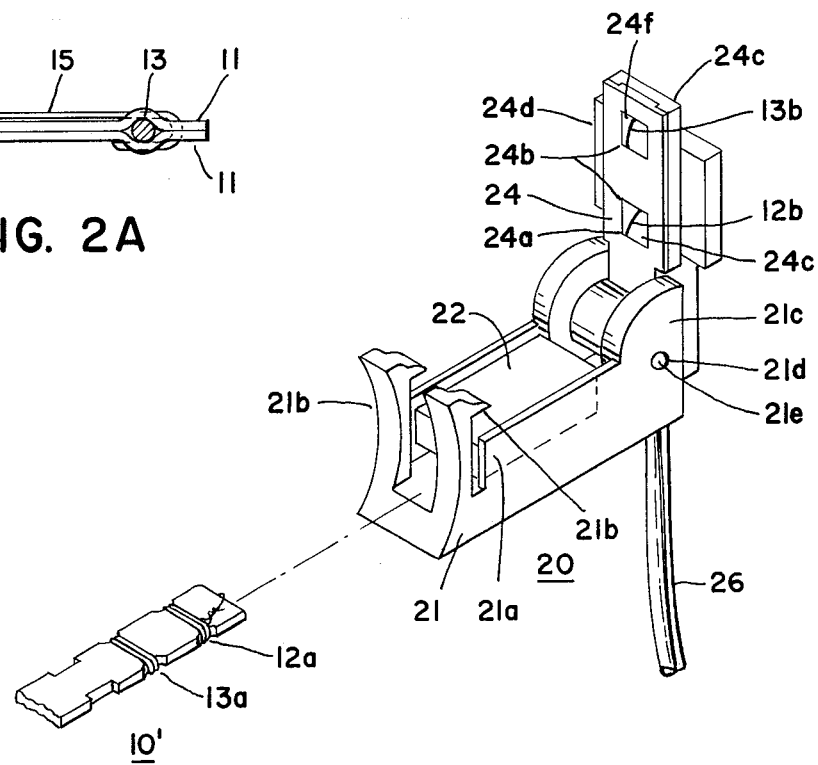
FIG. 1　FIG. 2　FIG. 3　FIG. 4
FIG. 2A
FIG. 5

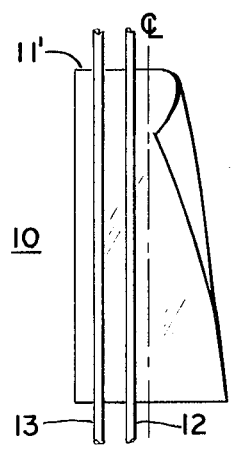
FIG. 6
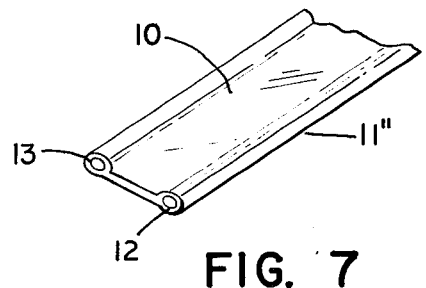
FIG. 7
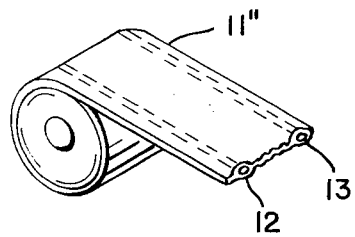
FIG. 8
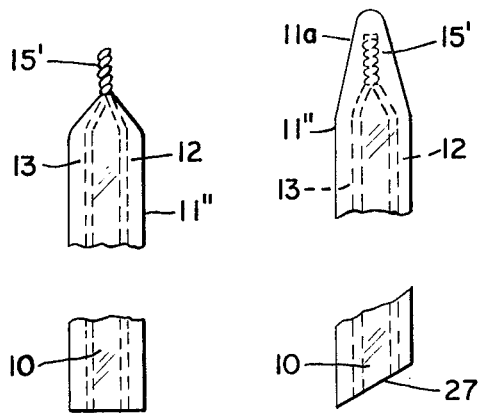
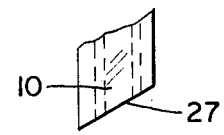
FIG. 9    FIG. 10
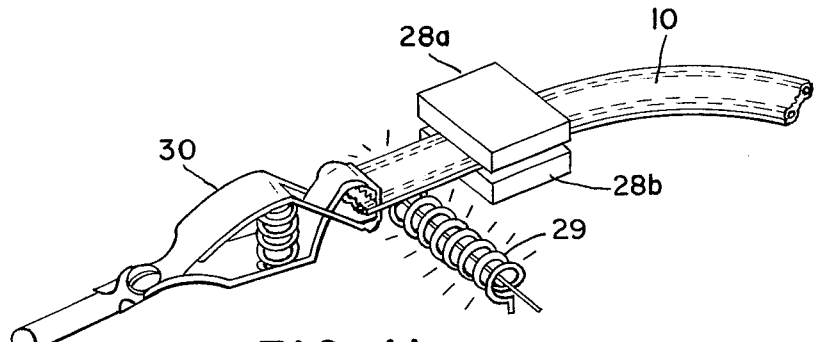
FIG. 11
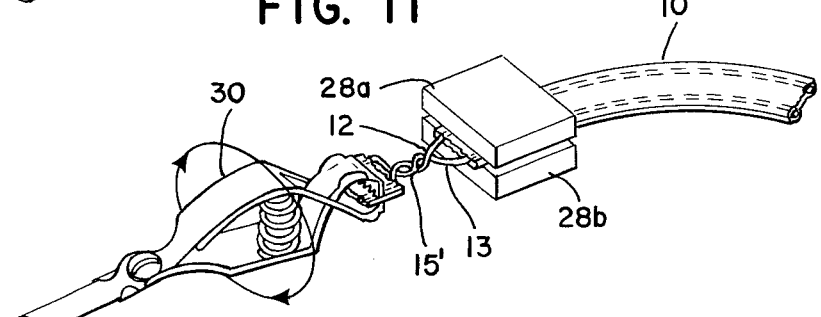
FIG. 12

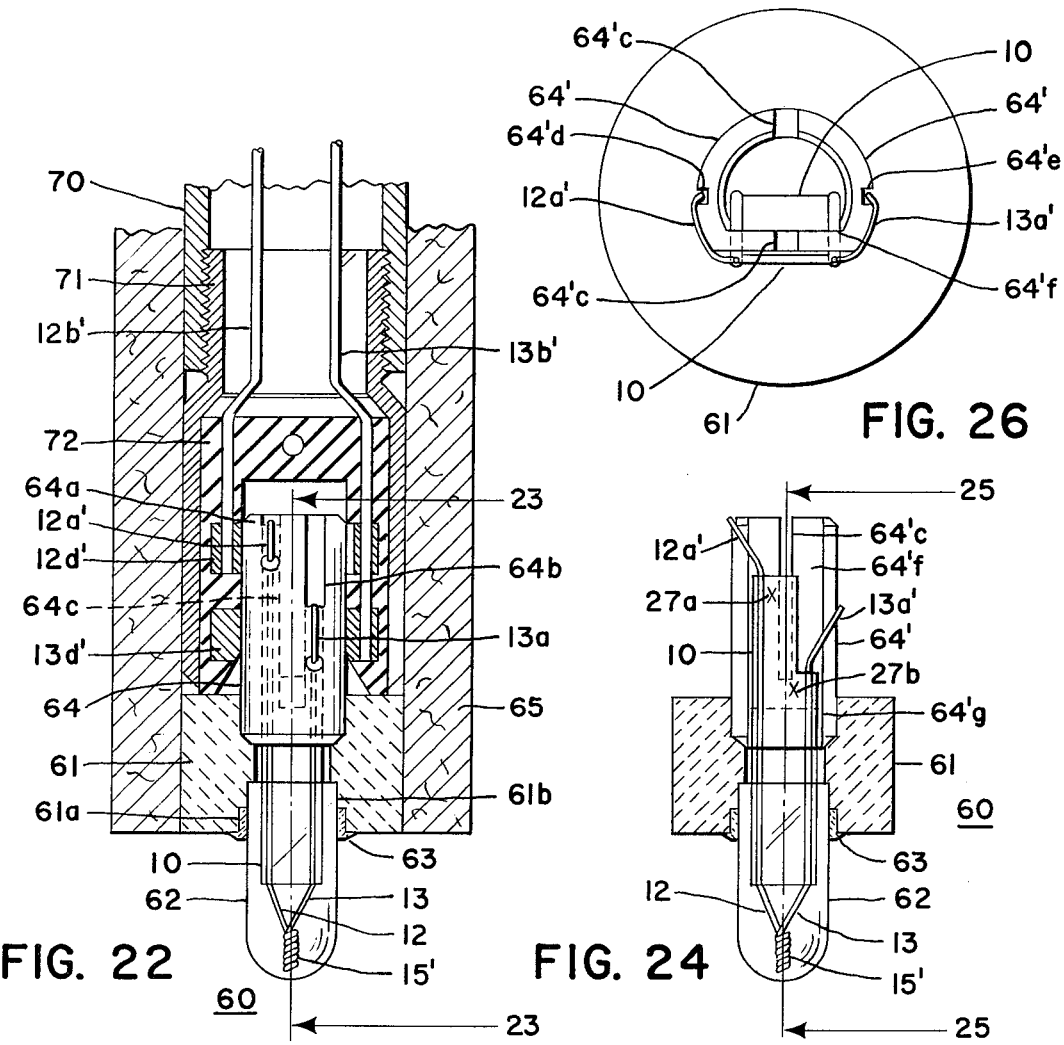

TAPE THERMOCOUPLE WITH INSULATION PIERCING JUNCTION MEANS

BACKGROUND OF THE INVENTION

1. Field of Invention

Applicant's invention relates to thermocouples which are classified in the U.S. Patent Office under Measuring and Testing, Thermometers, Current Generating Types and With Batteries of the Thermoelectric Type.

2. Description of Prior Art

Heretofore it has been customary in the manufacture of thermocouples from wire to utilize a pair of single conductor bare wires, a pair of single conductor insulated wires, or duplex thermocouple wire wherein individual wires are insulated and jacketed to form a cable. An example of a thermocouple made from the latter material is to be found in U.S. Patent application Ser. No. 117,771, filed Feb. 22, 1971. It is also known to form thermocouples by depositing thermocouple materials on a carrier material such as a thin strip of cellulose nitrate in a manner taught by Louis Harris in his article, Rapid Response Thermopiles, Journal of the Optical Society of America, Vol. 36, No. 10, October 1946, pages 597–603. Material for the manufacture of thermocouples has also been prepared in strip form wherein a ribbon is made of two foils of thermoelectric materials continuously welded edge-to-edge and thereafter the ribbon notched alternately through the first and then the second thermocouple material creating a series of evenly spaced thermojunctions as taught by C. M. Pelanne and C. B. Bradley in an article, "A Rapid Heat Flow Meter Thermal-Conductivity Apparatus", Materials Research & Standards, July 1962, pages 549–552.

U.S. Pat. No. 2,999,121-H. G. Mead — Fast Acting, Totally Expendable Immersion Thermocouple; taught an entirely new concept in the use of thermocouples wherein a thermocouple is used once to measure the temperature of a bath of molten metal such as steel and discarded in order to guard against contamination of the thermocouple and loss of accuracy. Acceptance of this technique has resulted in manufacture of such thermocouples in tremendous quantities, that is to say, they are now manufactured by the millions. Their further acceptance was made possible by the use of improved materials and techniques which effected further reduction in cost thus making it more economically feasible to discard the thermocouple after a single use. Recently efforts have been made to apply the expendable, i.e. the disposable unit philosophy in other fields of temperature measurement, particularly the medical field for obtaining the temperature of various parts of the human body each time using new, sterile, low-cost means to avoid cross-contamination between and among patients.

U.S. Pat. No. 3,663,917-P. Mahmoodi, discloses a thermistor thermometer with a detachable throw-away plastic sheath having a heat conducting metal tip in an effort to make such temperature measurements economically feasible. In a hospital, doctor's office, clinic, etc. the cost of throwing the temperature measuring element away has to date been objectionable although it is realized that the use of a temperature sensing device without intervening separable media is faster and more accurate. A throw-away temperature sensing device in the form of a thermocouple requires that it be made of very low cost materials, be free of relatively expensive components such as separate connectors, and require a minimal amount of labor to construct the thermocouple.

Applicant's invention is directed toward supplying thermocouple material in a form from which many types of thermocouples can be made and which will permit further reduction in the cost of manufacture of expendable thermocouples by providing materials in a form suitable for use in automatic machines.

Medical applications not only require ultra low cost to justify using a thermocouple only once for obtaining a temperature measurement but additionally require that the thermocouples be in a form suitable for insertion into a body cavity or for placement in good contact with a patient's skin. It is also very important that the thermocouple be provided with fool-proof means for connecting it in circuit with the proper polarity again with emphasis on minimal cost.

SUMMARY OF THE INVENTION

In accordance with applicant's invention there is provided material in the form of a thermocouple tape for the manufacture of low cost thermocouples. The thermocouple tape is comprised of a pair of electrical conductors of dissimilar thermoelectric materials coextensive with the length of the tape with the conductors supported in spaced, substantially parallel, relation along the marginal edges of a continuous length of thin, flat, flexible, electrically insulating material which is many feet long, has a flat web portion with a width of at least five but preferably ten or more times the greatest dimension of the cross sectional area of one of the electrical conductors disposed between the conductors thus separating the conductors one from the other throughout the length of the tape, and which has an overall thickness no more than about one quarter of the width of the tape.

In one form of applicant's invention the thermocouple tape may comprise two thicknesses of thin paper strip or similar electrically insulating material and an electrically nonconducting adhesive fixedly supporting electrical conductors of dissimilar thermoelectric materials in spaced parallel relation between the thicknesses of paper and along the marginal edges of the strips electrically insulating the conductors from each other and from contact with any object the tape may touch.

In a preferred form of applicant's invention the thermocouple tape is comprised of fine wires of dissimilar thermoelectric materials coextensive with the length of the tape embedded in a strip of thin, flat, flexible thermoplastic material many feet in length with a flat web portion of the thermoplastic material equal in width to five or more times the diameter of one of the fine wires disposed between and separating one wire from the other. For medical use water white translucent polyethylene has been found to be a very satisfactory thermoplastic material.

It is further an object of applicant's invention in its preferred form to manufacture a thermocouple by the method which comprises withdrawing a length of thermocouple tape from a supply roll, joining the electrical conductors of the tape to form a thermoelectric junction, severing the tape from the supply roll to provide a thermocouple of desired length, and simultaneously trimming the conductors to different lengths at the end of the thermocouple remote from the thermoelectric junction in a manner to provide polarized electrical contacts.

BRIEF DESCRIPTION OF THE DRAWINGS

For a better understanding of applicant's invention and advantages which may be obtained by its use the following specification should be read with reference to the following figures of drawing wherein:

FIG. 1 is a plan view showing a piece of thermocouple tape in accordance with applicant's invention, FIG. 2 is a plan view illustrating one form of thermocouple constructed in accordance with applicant's invention, FIG. 2A is an end view on an enlarged scale of the thermocouple of FIG. 2, FIG. 3 is a plan view showing a cut piece of thermocouple tape for making a thermocouple as shown in FIG. 4, FIG. 4 is a plan view showing another type of thermocouple made from thermocouple tape in accordance with applicant's invention, FIG. 5 is a perspective view showing a connector to receive the connector portion of the thermocouple of FIG. 4, FIG. 6 is a plan view partly in perspective illustrating another form of thermocouple tape in accordance with applicant's invention, FIG. 7 is a perspective view showing a section of an extrusion molded thermocouple tape in accordance with applicant's invention, FIG. 8 is a perspective view showing a roll of thermocouple tape ready for use in the manufacture of thermocouples, FIG. 9 is a plan view of a thermocouple with a bare thermoelectric junction made from thermocouple tape, FIG. 10 is a plan view of a thermocouple with an electrically insulated junction and a connector end cut diagonally from thermocouple tape, FIG. 11 is a perspective view illustrative of one step in a method of making thermocouples from thermocouple tape in accordance with applicant's invention, FIG. 12 is a perspective view illustrative of another step employed in making a thermocouple from thermocouple tape in accordance with applicant's invention, FIG. 22 is a side elevation partly in section illustrating the use of applicant's thermocouple tape in an expendable immersion thermocouple, FIG. 23 is a side elevation of the expendable element of FIG. 22 taken along the line 23—23 of FIG. 22, FIG. 24 is a side elevation partly in section illustrating the use of thermocouple tape in another modification of an expendable immersion thermocouple, FIG. 25 is a side elevation taken along line 25—25 of FIG. 24, and FIG. 26 is a top plan view on an enlarged scale of the thermocouple of FIG. 24.

DESCRIPTION OF PREFERRED EMBODIMENTS

Figure 13:
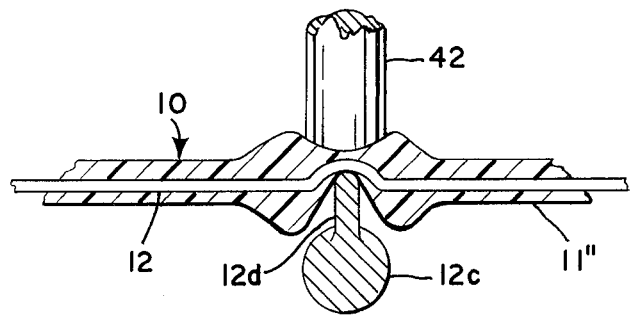
FIG. 13 is a side view partly in section on an enlarged scale illustrative of a method of making electrical connection with the thermoelectric conductors of a thermocouple made from thermocouple tape.

Throughout the following description the same reference numerals are utilized when a part and its function are the same. Where a part is similar and its function is the same the reference numeral will include a prime.

In FIG. 1 there is shown a short piece of thermocouple tape 10 constructed in accordance with applicant's invention. While only a short piece is shown in FIG. 1 it is to be understood that preferably, although not necessarily, the thermocouple tape may be made thousands of feet at a time and wound into rolls of, for example, 5,000 feet each. It is then ready for use at which time it may be more or less continuously withdrawn from a roll and thermocouples with the desired configuration cut therefrom and other necessary operations performed manually but preferably by an automatic machine.

In FIG. 1 a length of electrically insulating material has a pair of spaced apart electrical conductors 12 and 13 of different thermoelectric materials embedded therein. The insulating material 11 may be comprised of thin strips of paper, plastic, cellulose acetate film, or the like. For some applications SCOTCH brand Cellophane Tape No. 600 sold in the U.S.A. by Minnesota Mining & Mfg. Co., Saint Paul, Minn., will be found satisfactory or their SCOTCH brand Magic Transparent Tape may be used. Another among the many usable materials is a masking tape such as MYSTIK Tape sold in the U.S.A. by the Borden Chemical Co. MYSTIK Tape Div. Northfield, Ill. The electrical conductors 12 and 13 may be copper and constantan, chromel and alumel, platinum and platinum 10 percent rhodium, or any other suitable combination of thermoelectric materials. A finished tape may comprise No. 30 B&S gage thermocouple wires spaced apart a distance of approximately seven thirty-seconds inch on insulating material one-fourth inch wide, however, such suggested dimensions are merely an example and not to be considered as limitations. In actual production elements of adhesively coated strip with the electrical conductors 12 and 13 fed simultaneously so as to be sandwiched therebetween may be rapidly assembled to form a thermocouple tape which is stored in rolls ready for use. If desired one surface of the tape may bear a printed or embossed line such as line 11x or other identification means whereby the polarity of the thermocouple may be readily determined and kept track of by a simple instruction to a person using the tape.

In FIG. 2 there is shown a thermocouple made from a length of thermocouple tape 10 as described in FIG. 1 wherein 11 is of a soft plastic material which is easily displaced by deformation. In manufacturing a thermocouple of the type shown in FIG. 2 it is only necessary to insert a staple 15 of any suitable electrically conductive material at one end of the piece of tape electrically to connect the ends of the electrical conductors 12 and 13 to form a thermoelectric junction and by a similar operation staple a pair of measuring instrument leads of suitable material into electrical connection with conductors 12 and 13, as with staples 16 and 17, at the other end of the tape. The material 11 for this type of thermocouple will be sufficiently plastic to permit it to be squeezed aside by a staple thus to effect the desired electrical connections. Those skilled in the art of thermoelectric pyrometry will have no difficulty in selecting materials which are suitable for conductors 12 and 13 and the staples 15–17. The formation of a thermocouple in the foregoing manner with inexpensive materials makes possible the rapid production of thermocouples at very low cost. As is believed readily apparent the length of such a thermocouple is substantially without limit. Instead of stapling leads to the thermocouple the tape may be cut sufficiently long for the conductors 12 and 13 to serve as leads and the ends thereof stripped bare for making electrical connection to a terminal screw or the like.

In FIG. 3 there is shown a cut piece of thermocouple tape 10 having ends of the conductors 12 and 13 bare of insulating material 11. Additionally, the insulating material 11 is trimmed in a manner leaving a tail piece 11a and notches 11b and 11c. In this form the piece of thermocouple tape 10 is ready for use to make the thermocouple of FIG. 4.

In FIG. 4 there is shown a complete thermocouple 10' wherein the cut piece of thermocouple tape 10 of FIG. 3 has been utilized. As viewed in FIG. 4, the upper ends of the electrical conductors 12 and 13 are joined at 15' in any suitable manner to form a thermoelectric junction and the lower ends of the conductors 12 and 13 are wrapped on the tail piece 11a in the manner shown to form electrical contact structures 12a and 13a from the conductors themselves. By longitudinally displacing the wraps of wire 12a and 13a there are provided polarized contacts for the thermocouple as is more clearly illustrated by reference to FIG. 5.

In FIG. 5 the connector end of the thermocouple 10' is illustrated in a position ready for insertion into a connector element 20. The connector element 20 includes a lower box-like portion 21 having upstanding sides 21a and upstanding latch pieces 21b with a wide slot therebetween. The right hand end of the box-like structure includes a pair of upstanding ears 21c each having a hole 21d for reception of a pivot pin 21e. Supported in the box is a pad 22 of resilient material such as sponge rubber or the like.

Pivotally supported by the pin 21e is a lid 24 which is made from a plurality of pieces which may be cemented together or otherwise secured thereby to form a single unit. Piece 24a has a lower cylindrical offset end mounted on pivot pin 21e. The piece further includes a pair of rectangular cut-outs 24b which receive similarly shaped pad structures 24e, 24f which protrude from a piece 24c. The bare ends of lead wires 12b and 13b of a cable 26 are stretched tightly across the pads and thereafter the pads are inserted in the cut-outs 24b so that the surrounding material of 24a secures the wires 12b, 13b in place. The two pieces 24a and 24c are cemented together to form the lid 24. The piece 24c includes as a part thereof a rectangular portion 24d which forms a handle.

In operation the connector end of the thermocouple 10' is inserted between the upstanding latch elements 21b so that the contacts 12a and 13a lie on the pad 22. The lid 24 is then closed down and the resilient latch members engage the edge of the lid with the protruding portions 21b' hooked over the edge of piece 24c to keep the lid closed. By this means the connector end of the thermocouple is retained in place with the pad 22 exerting pressure in a manner to urge the contacts 12a, 13a firmly into engagement with the contacts 12b, 13b. It may be noted that no matter which side of the thermocouple 10' is facing upwardly the contact 12a will engage contact 12b and the contact 13a will engage the contact 13b, hence it becomes clear that a connection of the wrong polarity cannot be made. Additionally, the configuration of the contact structures is such as to prevent accidental separation of the connected elements.

In FIG. 6 there is illustrated another form of thermocouple tape 10. Instead of utilizing top and bottom strips of insulating material 11 with the thermocouple wires sandwiched therebetween, a single width of insulating material 11' which is twice as wide as a strip 11 may be utilized in which case, as viewed in the drawing, the portion of the tape to the left of the center line, is covered by the portion to the right of the center line. During assembly the strip 11' may be withdrawn from a roll and the conductors 12 and 13 automatically fed from reels in superposed relation to the portion of the insulating material to the left of center and substantially simultaneously the other half of the strip may be guided to its superposed position over the conductors 12 and 13 and sealed in place ready for winding the finished tape into a reel or roll.

In FIG. 7 there is shown a very desirable form of thermocouple tape 10 which may be produced using a pair of thermoelectric conductors 12 and 13 embedded in a thermoplastic electrically insulating material 11'' such as water white polyethylene. Thermocouple tape employing this type of insulating material has many desirable qualities useful for making thermocouples by automatic machinery and has other advantages for reasons hereinafter set forth.

In FIG. 8 there is illustrated a roll of extrusion molded thermoplastic thermocouple tape like that of FIG. 7.

In FIGS. 9 and 10 there are shown thermocouple structures readily made by machine methods from thermoplastic thermocouple tape 10 such as illustrated in FIGS. 7 and 8. In the modification of FIG. 9 a section of the thermoplastic tape 10 containing conductors 12 and 13 molded in plastic insulating material 11'' has at its upper end an uninsulated twisted thermoelectric junction 15'. In FIGS. 11 and 12 the method of automatically forming the junction 15' is illustrated, however, those skilled in the art will understand that satisfactory automatic machinery can be made to accomplish the operations of FIGS. 11 and 12.

In FIG. 11 there is shown an end of thermoplastic thermocouple tape 10 clamped between a pair of plates 28a and 28b to hold the tape for forming. Adjacent the plates 28a and 28b is a heater 29 by means of which the temperature of the plastic material 11'' may be raised to its softening or its melting point as desired. A battery clamp 30 is employed to illustrate a means for grasping the end of tape 10 in order that a thermoelectric junction may be formed.

In FIG. 12 there is illustrated the forming of a thermoelectric junction by rotation of the tape 10 after plastic 11" has been melted from the thermocouple wires 12 and 13 in the region of the tape where the junction is to be formed. Upon completion of the junction the twisted portion may be cut and simultaneously tape 10 may be automatically cut to a desired length which results in the formation of the thermocouple as shown in FIG. 9. As will be evident to those skilled in the art, automatic machinery may be designed so that a pair of thermocouples such as shown in FIG. 9 will be simultaneously produced with each cut-off operation by constructing the machine in a manner to twist the tape at a point between ends of the proposed pair of thermocouples. Also, the heater temperature may be adjusted merely to soften the plastic in which case rotation of the clip 30 or its proper counterpart will squeeze the softened plastic from the wires where they are tightly twisted leaving the wires in electrical contact and a soft mass of the plastic on the wires and about the twisted junction. Thereafter the junction end of the thermocouple may be inserted into a mold at a proper temperature and pressure applied thereby to provide plastic insulation of about the same thickness as tape 10 over the junction 15' by squeezing the plastic clinging to junction 15' into a shape indicated by reference numeral 11a of FIG. 10. Additionally, when the tape is cut off the end of the thermocouple tape opposite the end having the thermoelectric junction 15' may be cut on a diagonal as shown by the reference numeral 27 for reasons later to be described.

A thermocouple of the material and having a configuration like that of FIG. 10 has particular utility for use as an under-the-tongue thermometer. The thin, flat, smooth exterior of the plastic tape with the plastic of substantially the same thickness molded over the junction 15' is comfortably received under the tongue and will respond rapidly to temperature. The type of plastic employed is medically speaking acceptable for insertion into the mouth of a human. The diagonally cut end 27 provides foolproof means to connect the thermocouple to a measuring circuit with the proper polarity. Thermocouples of the FIG. 10 type having a length of about 5 inches are so low in cost that it is economically feasible to discard them after a single use.

In FIG. 13 there is illustrated the principle of operation of a connector for making contact with the thermoelectric conductors 12 and 13 of thermocouples having soft plastic insulating material 11". In FIG. 13 an electrically conductive element 12c may be joined by any suitable means to an electrical conductor 12b (not shown) of a connector cable 26 such as that shown only in FIG. 5. Element 12c has an upstanding anvil 12d having a slightly rounded edge. Thermocouple tape 10 having soft plastic insulating material 11", such as polyethylene, is shown compressed between anvil 12d and a pressure applying means 42. By means 42 the tape 10 and its embedded wire 12 are pressed tightly against the anvil so that the rounded edge having substantially a point contact with the electrically insulating material of the tape squeezes the insulation aside so that the anvil 12d makes direct contact with the embedded wire 12 in a manner similar to that wherein the staple 15 of FIG. 2 pushes the insulating material aside to establish electrical contact with wires 12 and 13. The principle itself is not new, for example, it has been employed for fastening electrical plugs to lamp cord for making up an extension. The foregoing principle may be utilized with applicant's thermocouple tape in a unique manner whereby properly polarized connections may always be made to a thermocouple as illustrated in FIGS. 14–17 and 18–21.

Figure 14:
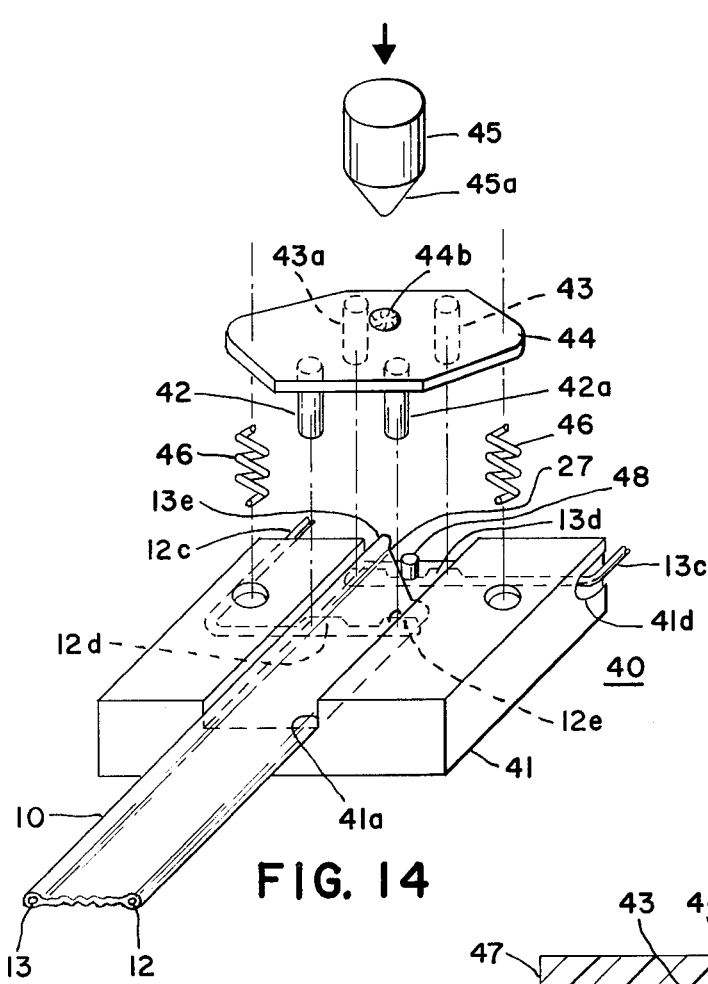
FIG. 14 is a partial perspective view partly in section illustrative of a connector structure embodying the principle of FIG. 13.

In FIG. 14 there is illustrated an exploded view of a thermocouple connector 40 whereby a thermocouple made from thermocouple tape 10 having its connector end cut on a diagonal, as shown in FIG. 10, may be connected in a manner insuring connection with the proper polarity no matter which side of the thermocouple faces up when inserted into the connector. The connector 40 includes a base plate 41 having a central slot 41a for reception of the connector end of a thermocouple of the type shown in FIG. 10. The base 41 supports an electrically conductive anvil structure 12c having upstanding portions 12d and 12e and a second similar anvil structure 13c having upstanding anvil portions 13d and 13e, 12c and 13c may be connected to wires 12b and 13b, not shown, of a cable 26 connected to a measuring circuit as in FIG. 5. These anvil structures are inserted in the base 41 by way of holes and slots 41d only one of which is indicated in FIG. 14. An end stop in the form of a pin 48 coacts with the diagonal end 27 of the thermocouple tape 10 and serves to position the tape in slot 41a. Overlying the slotted base plate and supported by a pair of springs 46 within the cavity of a cover 47 (see FIG. 17) is a switch actuator plate 44. The switch actuator plate 44 supports four pressure applying pins 42, 43, 42a, 43a which function in the manner disclosed in FIG. 13 when pressure is applied to the plate by means of a pressure applicator 45 which has a conical point 45a engaging a spherical depression 44b in plate 44. The assembled relation of the parts is best understood by reference to the side elevation, partly in section, of FIG. 17. A cam 49, shown only in FIG. 17, is suitably supported over the pressure applying means 45 whereby the plate 44 may be maintained in its depressed position when it is desired to establish and maintain electrical connection between the thermocouple and a metering circuit. The operation of the connector of FIGS. 14 and 17 is best understood by reference to FIGS. 15 and 16.

Figure 15:
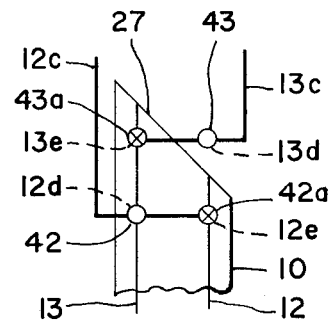
FIG. 15 is a digrammatic view illustrating the operation of the connector of FIG. 14.

In FIG. 15 there is illustrated diagrammatically the relationship which will exist between the thermocouple wires 12, 13, the anvils 12d, 12e, 13d, 13e, and pins 42, 42a, 43, 43a when the end of thermocouple tape 10 is inserted into the connector 40 with the diagonal cut 27 slanting upwardly to the left. As may be observed with reference to FIG. 15, 12c is connected to anvils 12d and 12e and 13c is connected to anvils 13d and 13e. With the tape inserted into the slot 41a, as illustrated in FIGS. 14 and 15, no portion of the tape 10 will be disposed over the anvil 13d, hence when pressure is applied to the pressure applying means 45 by rotation of the cam 49, plate 44 will be free to tip about an axis defined by an imaginary line through the centers of anvils 12e and 13e so that no pressure will be exerted by the pin 42 of plate 44 over the anvil 12d, however, pressure will be applied by the pins 42a and 43a thus to effect electrical connections at 12e and 13e. By this means electrical connection is established between conductor 12 through anvil 12e to 12c and between conductor 13 through anvil 13e to 13c. The points of electrical connection being indicated by the crosses on pins 42a and 43a.

Figure 16:
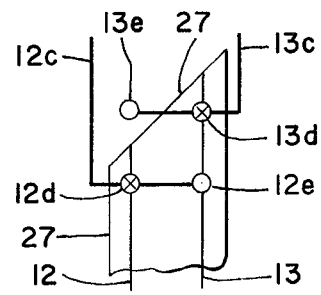
FIG. 16 is a diagrammatic view further illustrating operation of the connector structure of FIG. 14.
Figure 17:
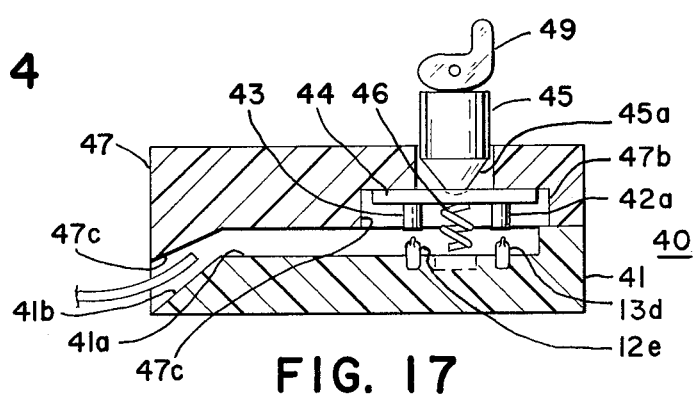
FIG. 17 is a side elevation partly in section showing a feature for use with the connector of FIG. 14.

If thermocouple tape 10 be inserted in connector 40 with the diagonal cut 27 disposed so as to slant upwardly to the right, as shown in FIG. 16, the absence of tape over anvil 13e will permit plate 44 to tip about an axis formed by an imaginary line drawn between anvils 12d and 13d. When this occurs no electrical contact will be established at anvils 12e and 13e, however, the pressure pins 42 and 43 will apply pressure at anvils 12d and 13d to establish electrical connections. It may now be observed as indicated by the crosses that conductor 12 is again connected to 12c and conductor 13 is again connected to 13c. From the foregoing it is believed clear that no matter which side of the thermocouple tape 10 is up when inserted into the connector 40 the electrical connections will be established with the same polarity.

In FIG. 17 there is shown a desirable feature which may be included for the slot 41a of FIG. 14. In FIG. 17 it may be noted that the entrance to slot 41a is formed with a downwardly sloping portion 41b having opposed thereto a slanting portion 47c of the closure member 47. With this arrangement when the end of thermocouple tape 10 is inserted into the slot through the entrance opening formed by the opposed surfaces just described, any twist or curl in the tape will be smoothed out so that the tape will readily slide over the anvils 12d, 12e and 13d, 13e.

In FIGS. 18-21 there is illustrated a connector 50 which is slightly different from the connector of FIGS. 14-17. This connector includes a base plate 51 having a slot 51a for reception of the end of a thermocouple having a diagonal cut 27 like that shown in FIG. 10. Supported in slots and holes 51d are anvil structures 12c and 13c like those used in connector 40. Additionally, the base 51 includes an arcuate recess 51b for a purpose later to be described. Instead of a stop pin the base 51 includes an upstanding pointed portion 58 which coacts with cut 27 and serves as a stop to position tape 10 in the slot.

Figure 18:
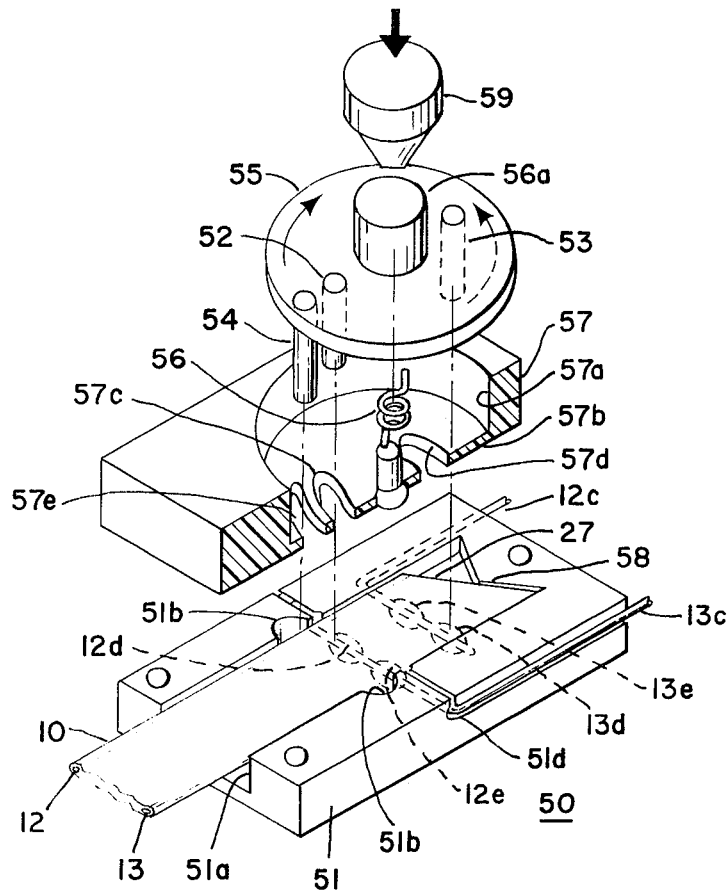
FIG. 18 is a perspective view partly in section showing another connector structure suitable for use with the thermocouple of FIG. 10.
Figure 21:
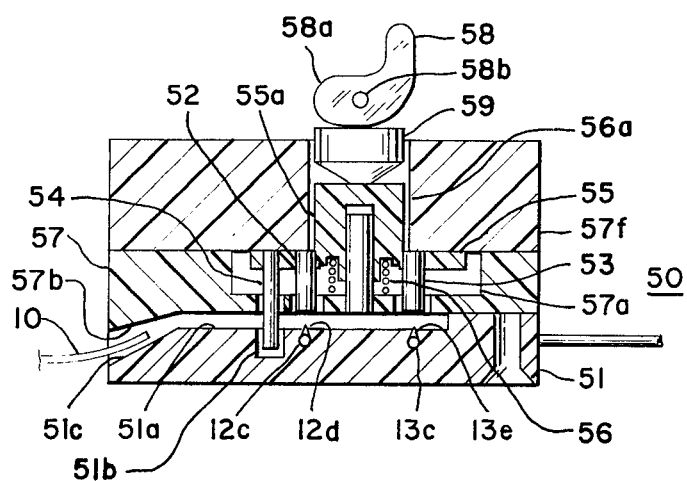
FIG. 21 is a side elevation partly in section showing features of the connector of FIG. 18.

Still referring to FIG. 18, above base 51 is shown a cover plate 57 which is one of a pair of plates (see FIG. 21) which together form a structure which houses and supports a pressure applying plate 55 having a pair of pressure pins 52 and 53 adapted to project downwardly through arcuate slots 57c and 57d at the bottom of a counterbore 57a in cover plate 57. Pressure plate 55 additionally supports a rotator pin 54 which projects downwardly and through an arcuate slot 57e which overlies recess 51b. As best seen in FIG. 21 when the connector is assembled a spring 56 housed in an upward extension 55a of plate 55 biases plate 55 upwardly so that pins 52 and 53 are retracted and do not project beyond the lower surface 57b of cover plate 57, however, pin 54 extends below the surface 57b into arcuate recess 51b. Centering spring means not shown biases plate 55 to a position such that in the absence of the end of a thermocouple in slot 51a pin 54 will be in the center of the slot. When tape 10, as shown in FIG. 18, is inserted into slot 51a the diagonally cut end 27 will engage pin 54 and acting as a cam will move the pin aside into one of the ends of arcuate slot 51b to permit passage of tape 10 into the slot and into engagement with the stop 58. Such movement of pin 54 rotates plate 55 in a manner to control which anvil of each pair of anvils 12d,12e and 13d,13e will be utilized in establishing electrical connection with conductors 12 and 13 respectively.

Figure 19:
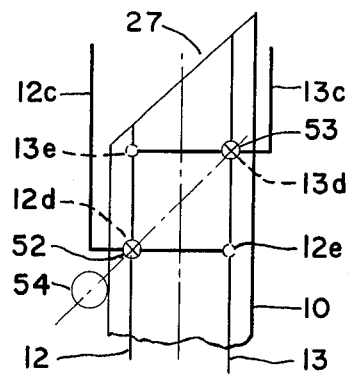
FIG. 19 is a diagrammatic view explaining the operation of the connector of FIG. 18.
Figure 20:
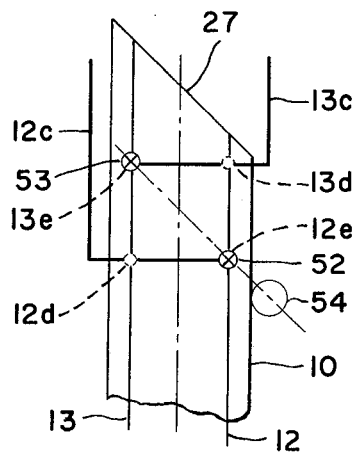
FIG. 20 is a diagrammatic view further illustrating the operation of the connector of FIG. 18.

The principle of operation of switch 50 is substantially like that of switch 40. It is best understood, however, by referring to the diagrammatic showings of FIGS. 19 and 20. In FIG. 19 tape 10 is illustrated as being inserted into connector 50 with the diagonal 27 slanting upwardly to the right. As mentioned above, upon entrance into slot 51a the diagonal will first engage pin 54 and with the diagonal disposed as shown in FIG. 19 pin 54 will be moved to the left thus rotating plate 55 clockwise as indicated by the solid line arrow on plate 55 in FIG. 18. This movement positions pin 52 over anvil 12d and pin 53 over anvil 13d. When actuator button 59 is pressed downwardly, as by a cam surface 58a of a lever 58, pressure will be applied to the tape by the pins 52 and 53 to establish electrical connections at anvils 12d and 13d. As may be observed from FIG. 19, conductor 12 will be connected at anvil 12d to 12c and conductor 13 will be connected at anvil 13d to 13c. If tape 10 be inserted into connector 50 with its other side up, as shown in FIG. 20, the diagonal cut end 27 of tape 10 will push pin 54 to the right thus rotating plate 55 counterclockwise as indicated by the dotted line arrow in FIG. 18 thus moving pin 52 over anvil 12e and moving pin 53 into a position over anvil 13e. If now actuator button 59 be moved downwardly as by a lever 58, electrical connection will be established between conductors 12 and 12c by way of anvil 12e and conductor 13 will be electrically connected to 13c by way of anvil 13e. Hence, no matter which side up tape 10 be inserted in the connector electrical connections will be made with the same polarity.

Again referring to FIG. 21, it may be observed that the upwardly slanting passage formed by opposed surfaces 51c and 57b may be included in switch 50 to eliminate curl from thermocouple tape 10 when it is inserted into the connector.

FIGS. 22 and 25 illustrate the use of applicant's thermocouple tape in the manufacture of expendable immersion thermocouples of the generic type disclosed in the above-mentioned U.S. Pat. No. 2,999,121 to H. G. Mead and more specifically disclosed in U.S. Pat. Nos. 3,024,295; 3,048,642; and 3,493,439; for the purpose of effecting further cost reduction in the manufacture of expendable immersion thermocouples.

In FIG. 22 there is shown an expendable immersion thermocouple 60 supported in the immersion end of a cardboard tube 65. As well known to those skilled in the art, the expendable immersion thermocouple has plug-in connections for reception in a female connector receptacle 72 supported at the immersion end of manipulator 70 by means of a housing 71 attached to the manipulator. Structures of this type are disclosed in the above mentioned U.S. Pat. Nos. 3,024,295; 3,048,642; and 3,493,439.

The expendable thermocouple 60 having a thermocouple made from applicant's thermocouple tape 10 may be of the type disclosed in FIG. 9. It has been discovered by another that applicant's thermocouple tape 10 wherein the insulating material 11'' is water white polyethylene may be utilized in the measurement of molten materials at temperatures above the melting temperature of the plastic insulation without adverse affects. The thermocouple conductors 12 and 13 remain in spaced relation after melting of the plastic and the output of the thermocouple does not appear to be adversely affected by any gases or the liquid given off when the plastic insulation melts. The piece of thermocouple tape 10 may have a bare thermocouple junction 15' formed utilizing the techniques illustrated in FIGS. 11 and 12 or the thermocouple tape may be cut, the insulation removed, and the thermojunction welded as indicated in FIG. 4. The thermocouple is desirably supported within a protective well 62 which may be of fused silica or high temperature glass such as Vycor. The thermocouple is desirably supported from a tubular element 64 which may be made of plastic such as nylon, polyethylene, bakelite, high impact polystyrene, etc. The latter material is preferred and lends itself to utilization of the ends of the fine wires of the thermocouple to provide contact structures for electrical connection in the manner taught in U.S. Pat. No. 3,493,439. In that patent it is taught that instead of connecting the fine wires of an expendable immersion thermocouple to heavy elements of compensating lead-wire material in a manner taught in other of the above mentioned patents, the bare ends of the fine thermocouple wires themselves may be drawn tightly over a back-up area of the plastic tube 64 and heat sealed to the plastic to hold them in place. This may be accomplished as shown in FIG. 22 by positioning the ends 12a' and 13a' on the outer surface of tube 64 and heat sealing them in place.

FIG. 23 shows the expendable immersion thermocouple 60 sectioned along the line 23—23 of FIG. 22. In this view it is clear that the thermocouple tape 10 is well adapted for attachment to tube 64 which in turn is supported in a refractory body member 61 at one end thereof and protected by the thermocouple well 62 which is supported by the body 61 at the other end thereof and sealed in place by means of a refractory cement 63. The body member 61 has a counterbore 61a which provides an area for the cement 63. It additionally includes the counterbore 61b for reception of the refractory well 62 and a counterbore 61c for reception of the tube 64 which is desirably a force fit in the counterbore. The tube 64 has a deep cross slot 64c for providing additional resilience thus permitting a good interference fit of the contact areas 12a' and 13a' (FIG. 22) in the connector rings 12d' and 13d' which are connected to conductors 12b' and 13b' respectively which, as is understood by those skilled in the art, extend to recording apparatus.

FIGS. 24–26 illustrate another modification of an expendable immersion thermocouple utilizing the thermocouple tape of applicant's invention. The modification of these figures differs from the one just described in that a tube 64' has a flat portion 64'f. In this modification the thermocouple tape 10 is brought out through a slot 64'g at the lower end of the flat portion as shown in FIGS. 24 and 25 and secured on the outside of tube 64' by heat sealing the tape to the flat surface at points 27a and 27b. Tube 64' additionally includes shallow grooves 64'd and 64'e for receiving the tips of the bare ends 12a' and 13a' respectively which are heat sealed to the tube at these points. As best illustrated in the top plan view on an enlarged scale, FIG. 26, the thermocouple tape 10 passes readily from its central position in the protective well 62 upwardly on the flat exterior surface of tube 64' with the bare ends 12a' and 13a' of the thermocouple wires 12 and 13 drawn around the outer surface of the tube. Disposition of the thermocouple tape 10 on the outside of the tube makes it more readily accessible for machine sealing of the tape and the ends of the thermocouple wires to the tube.

It is believed apparent from the foregoing description that applicant's thermocouple tape wherein thermoelectric conductors of small cross-section mounted with a fixed orientation in spaced relation on low cost mounting materials offers many desirable advantages for producing thermocouples of many types and for many purposes at very low cost. In the course of illustrating applicant's invention and the manner of making connections to thermocouples made from tape by means which insure connections of the proper polarity there have been disclosed inventions which are not the invention of applicant. That which comprises applicant's invention is set forth in the claims:

What is claimed is:

1. A tape thermocouple comprised of a length of tape of electrically insulating material and having a pair of electrical conductors of dissimilar thermoelectric materials coextensive with the length of the tape with the conductors supported in spaced, substantially parallel relation along the marginal edges of the tape, said electrical conductors being electrically connected at one end of said tape to form the thermoelectric junction of said thermocouple, said electrical conductors having end portions at the other end of said tape for connecting said thermocouple to a measuring circuit, said end portions being longitudinally displaced along the length of said tape as an aid in connecting said thermocouple with the proper polarity, and electrically conductive insulation piercing means connecting one of said pair of electrical conductors to another to form said thermoelectric junction, said means being a part of said junction after said junction is formed.

2. A thermocouple according to claim 1 wherein each of said electrical conductors having end portions at the other end has said portions wrapped around said tape at locations longitudinally displaced along the length of said tape.

* * * * *